United States Patent

Ishikawa et al.

[11] Patent Number: 5,458,023
[45] Date of Patent: Oct. 17, 1995

[54] FLEXING CONTACT TYPE GEAR DRIVE OF NON-PROFILE-SHIFTED TWO-CIRCULAR-ARC COMPOSITE TOOTH PROFILE

[75] Inventors: Shoichi Ishikawa, Kanagawa; Yoshihide Kiyosawa, Nagano, both of Japan

[73] Assignee: Harmonic Drive Systems, Inc., Tokyo, Japan

[21] Appl. No.: 256,719

[22] PCT Filed: Nov. 24, 1992

[86] PCT No.: PCT/JP92/01536

§ 371 Date: Sep. 15, 1994

§ 102(e) Date: Sep. 15, 1994

[87] PCT Pub. No.: WO94/12809

PCT Pub. Date: Jun. 9, 1994

[51] Int. Cl.$^6$ .................................................. F16H 1/32
[52] U.S. Cl. ......................................................... 74/640
[58] Field of Search ............................................ 74/640

[56] References Cited

U.S. PATENT DOCUMENTS

| 2,906,143 | 9/1959 | Musser | 74/640 |
| 4,823,638 | 4/1989 | Ishikawa | 74/640 |
| 4,974,470 | 12/1990 | Ishikawa et al. | 74/640 |

FOREIGN PATENT DOCUMENTS 45-41171  12/1970  Japan .
63-115943  5/1988  Japan .

Primary Examiner—Dirk Wright
Attorney, Agent, or Firm—Burns, Doane, Swecker & Mathis

[57] ABSTRACT

In a flexing contact type gear drive (1), the respective tooth profiles of the internal gear (2) and external gear (3) are constructed such that the tooth face portion is formed of a straight line AM disposed in the vicinity of a datum point, a first convex circular arc (AB) smoothly connected thereto and a second convex circular arc (BC) smoothly connected to the first convex circular arc and having a radius of curvature larger than the first convex circular arc, while, the dedendum portion excluding the root is created by a standard rack consisting of a tooth profile formed by a curve point-symmetrical with respect to the datum point to the tooth profile at the tooth face or a curve obtained by correcting the above curve. The curve defined by the first and second convex circular arcs is an approximated curve of a similar curve obtained by subjecting to similar transformation at a reduction ratio of 1/2 from the limit point of meshing selected on a composite curve which is obtained by connecting a moving locus of teeth of the flexible external gear in a section of rotation at the vicinity of the end portion of the tooth trace on the side of a diaphragm to an envelope of moving loci obtained by overlapping on one plane of rotation the moving loci obtained by rack approximation of the external gear to the rigid internal gear in sections of rotation at the respective positions in the direction of tooth trace of the cup-shaped flexible external gear.

2 Claims, 7 Drawing Sheets

2 RIGID INTERNAL GEAR
3 FLEXIBLE EXTERNAL GEAR
4 WAVE GENERATOR

FLEXING CONTACT TYPE GEAR DRIVE OF NON-PROFILE-SHIFTED TWO-CIRCULAR-ARC COMPOSITE TOOTH PROFILE

TECHNICAL FIELD

The present invention relates to a flexing-contact-type gear drive having a cup-shaped flexible external gear, and particularly to tooth profiles of a rigid internal gear and a flexible external gear employed in this type of gear drive.

BACKGROUND ART

A flexing-contact-type gear drive typically consists of a rigid circular internal gear, a flexible external gear which has $2n$ (n being a positive integer) less teeth than the internal gear and which is disposed inside the internal gear and flexed into an elliptical shape so as to mesh with the internal gear at two places, and wave generator fitted inside the external gear for flexing it. The axial length of the flexing external gear is set approximately equal to the diameter thereof.

The basic tooth profile for the gears of a flexing contact gear drive is linear (see U.S. Pat. No. 2,906,143). On the other hand, an involute tooth profile has also been proposed by one of the inventors of the present invention (see Japanese Patent Publication No. SHO 55-41171). However, where the linear or the involute tooth profile is adopted as that of each of the internal and external gears, the addendum faces of the gears cannot be continuously meshed with each other.

For increasing load capacity the inventor of the present invention proposed a system using as the basis for the tooth face profile the curve obtained by similarity transforming the locus of motion at a reduction ratio of 1/2 over a prescribe range from the meshing limit point on the locus of motion based on the rack approximation of the tooth of the external gear relative to the internal gear determined by the shape of the wave generator (Japanese Patent Laid Open No. SHO 63-115923).

However, the each of the above inventions is directed to a flexing contact type gear drive of the type having a cylindrical flexible external gear called as a flat type or a pan cake type. Therefore, the change in deflection along an axis of the flexible gear caused by coning when the cup-shaped flexible external gear is employed, is not taken into consideration. Hence, the proposed tooth profiles function properly at a specific section of tooth trace (for example, at a section of non deviation), but at the other sections, defects such as non contact of the teeth, tooth interference and the like may occur. As mentioned above, although the tooth profiles of the above inventions are effective for a case where the cylindrical flexible external gear is employed, they are not applicable for a case where the cup-shaped flexible external gear is employed.

In addition, where a cup-shaped flexible external gear is reduced in its axial length for the purpose of volume reduction thereof, a degree of coning of the flexible external gear becomes larger, and so the defects caused by using the tooth profiles of the above inventions become remarkable.

In terms of these defects, there has been a demand for an improvement of the tooth profiles. Inventions disclosed in Japanese Patent Laid Open Nos. SHO 62-75153 and HEI 2-62461 are directed to an improvement for avoiding the above defects. In these methods, however, it is required to apply special additional-processing such as crowing, relieving and the like on teeth. Moreover, no consideration is made in the above publications on the reduction in axial length of a cup-shaped flexible external gear.

An object of the present invention is to provide a flexing contact type gear drive which, without requiring special additional-processing such as crowing, relieving and the like, is capable of realizing a wider range of meshing of the teeth along the whole tooth trace direction of a cup-shaped external gear without interference, and at the same time which is easily machined and is capable of reducing an axial length of the cup-shaped flexible external gear.

DISCLOSURE OF INVENTION

In order to achieve the above object, according to the present invention, reference is made to the fact that is originally disclosed by one of the present inventors of the present invention in Japanese Patent Application No. HEI 3-357036. That is, in a flexing contact type gear drive, moving loci of teeth of the cup-shaped flexible external gear at respective sections of rotation along the tooth trace direction thereof are found to be changed and decreased in deflection along the tooth trace direction viewed from the opening side of the flexible external gear, and that these moving loci are found to form a single envelope when these moving loci are overlapped on a same plane and the obtained envelope is similar to a curve obtained by similar transformation at a reduction ratio of 1/2 of a moving locus at a section of non deviation of the opening of the external gear.

In this patent application, a rack approximation method is introduced to simplify the analysis in finding a formula of the obtained envelope. Moreover, a moving locus of the flexible external gear is obtained at a section of rotation near and outside the diaphragm-side end of the flexible external gear, and is connected to the envelope to thereby form a composite curve.

Then, a portion of the composite curve which starts from a selected meshing limit point is subjected to the similarity transformation at a reduction ratio of 1/2 to obtain a curve which is employed as convex tooth profiles of tooth faces of the external and internal gears. Whereby, a flexing contact type gear drive of non-profile-shifted tooth profile is realized, which is capable of meshing continuously along the tooth trace direction.

According to the present invention, the high-dimentional curve defining the tooth profiles of the invention disclosed in the above Japanese Patent Application No. HEI 3-357036 is substituted by two convex circular arcs having a radius of curvature approximated to that of the high-dimentional curve, and these convex circular arcs are made to be a tooth profile. By defining tooth profiles with two convex circular arcs, gear cutting can easily be carried out and so gears can be manufactured at a reduced price.

Now, the theoretical explanation that the composite curve can be approximated by convex circular arcs as mentioned above is disclosed by the inventors of the present invention et.al. in Japanese Patent Laid Open No. HEI 1-295051. As like as the invention disclosed in this publication, in the present invention, a straight line is inserted in the vicinity of a datum point of tooth profiles so that tool sizes and gear cutting are easily controlled.

Furthermore, the tooth profiles of the present invention capable of continuous meshing along the tooth trace direction are employed, so that it is possible to avoid unbalanced distribution of rim stress of the flexible external gear caused by the increase in degree of coning due to the reduction in the axial length of the flexible external gear in order to obtain a small sized flexible external gear. As a result, a ratio of the axial length of the cup-shaped flexible external gear to the diameter thereof can be lowered from the conventional ratio of 1 to about 0.2 to about 0.7.

BEST MODE FOR CARRYING OUT THE INVENTION

An example of the present invention will now be described with reference to the drawings.

Figure 1:
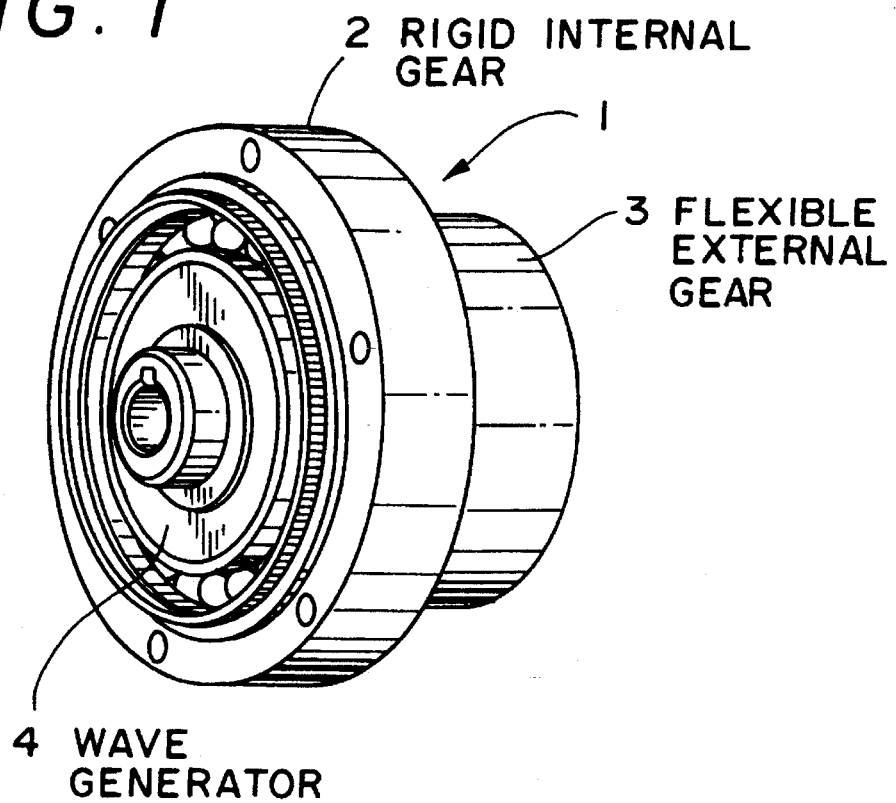
FIG. 1 a perspective view of a cup-shaped flexing contact type gear drive.
Figure 2:
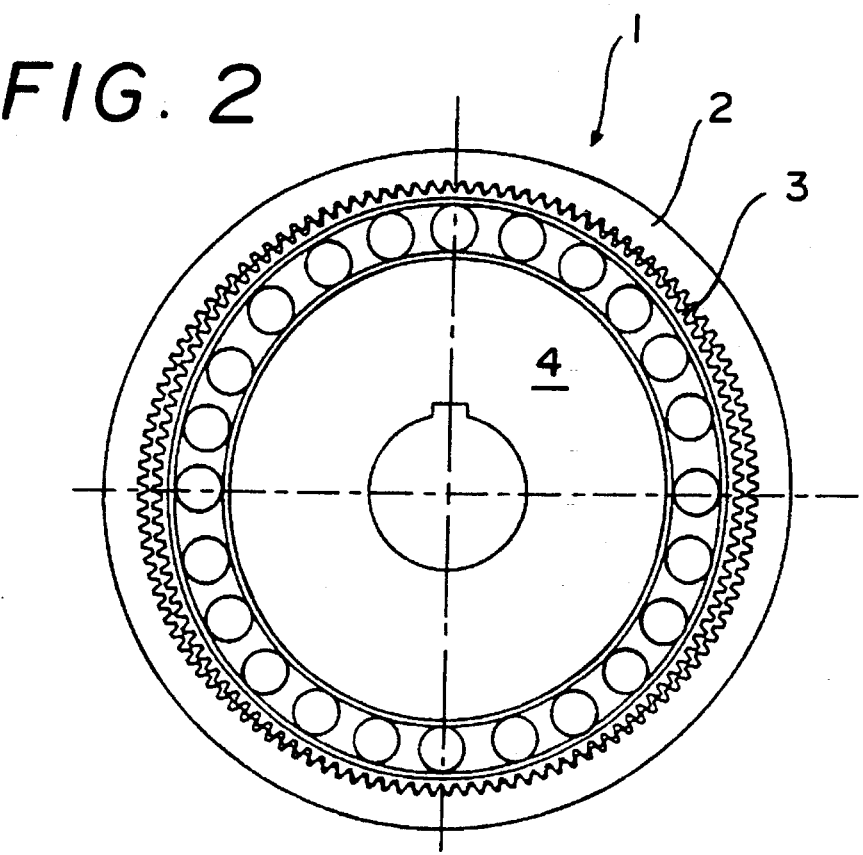
FIG. 2 is a schematic front view of the gear drive of FIG. 1.

FIGS. 1 and 2 are a perspective view and a front view of a known cup-shaped flexing contact type gear drive. The flexing contact type gear drive 1 comprises a circular rigid internal gear 2, a cup-shaped flexible external gear 3 disposed inside the internal gear, and an elliptically-shaped wave generator 4 fitted into the external gear. The cup-shaped flexible external gear 3 is in a state flexed into an elliptical shape by the elliptically-shaped wave generator 4.

Figure 3:
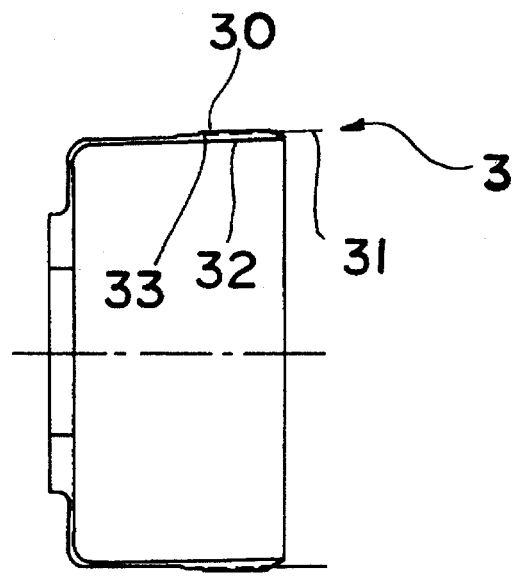
FIG. 3 is a sectional view of a cup-shaped flexible external gear before deflection, showing a state of the flexible external gear due to coning thereof.
Figure 4:
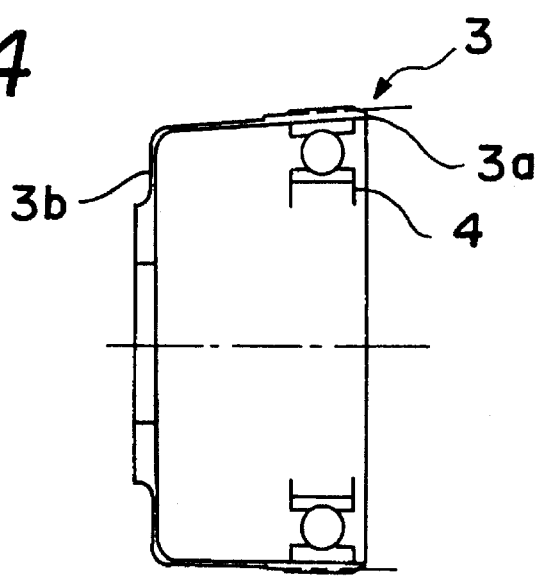
FIG. 4 is a sectional view of a cup-shaped flexible external gear after deflected into an elliptical shape, taken along an axis thereof and along a major axis of the elliptical shape, showing a state of the flexible external gear due to coning thereof.
Figure 5:
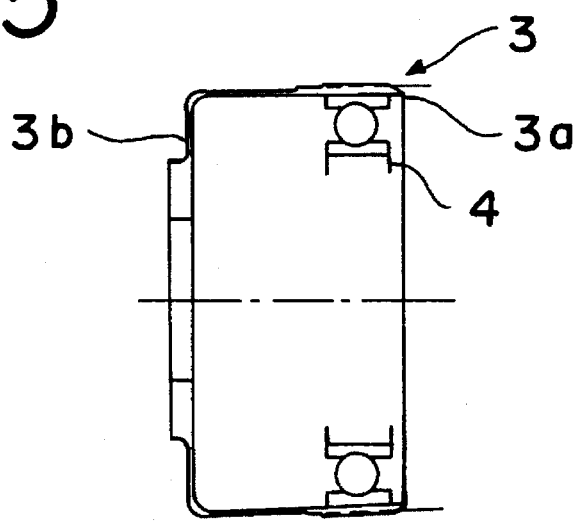
FIG. 5 is a sectional view of a cup-shaped flexible external gear after deflected into an elliptical shape, taken along an axis thereof and along a minor axis of the elliptical shape, showing a state of the flexible external gear due to coning thereof.

FIGS. 3, 4 and 5 show a state of deflection of the flexible external gear caused by coning, respectively, by means of a section taken along an axis of the flexible external gear. FIG. 3 shows a state of deflection of the external gear before flexed by the wave generator 4 (before deflection). FIG. 4 is a sectional view taken along the axis of the external gear and along a major axis of the wave generator, showing a state flexed by the wave generator 4. Whereas, FIG. 5 is a sectional view taken along the axis of the external gear and along a minor axis of the wave generator, showing a state flexed by the wave generator. As can be seen from these figures, the cup-shaped flexible external gear 3 is deflected owing to coning, so that the deflection in value is maximum on its opening 3a, and is gradually decreased toward the side of its diaphragm 3b.

Tooth Profile Capable of Continuous Contacting

First, there will be explain a method for obtaining a composite curve defining tooth profiles, the method being disclosed by one of the present inventors in Japanese Patent Application No. HEI 3-357036.

Figure 6:
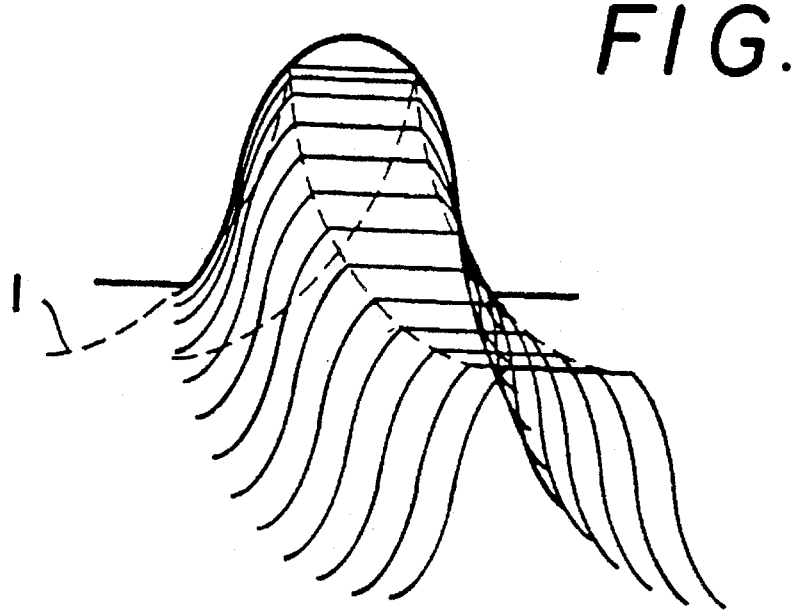
FIG. 6 illustrates a motion and a locus of one of teeth of a cup-shaped external gear when moving with respect to a tooth groove of a rigid internal gear, showing the motion and locus at a section of rotation on an opening of the cup-shaped flexible external gear (a section of non deviation).
Figure 7:
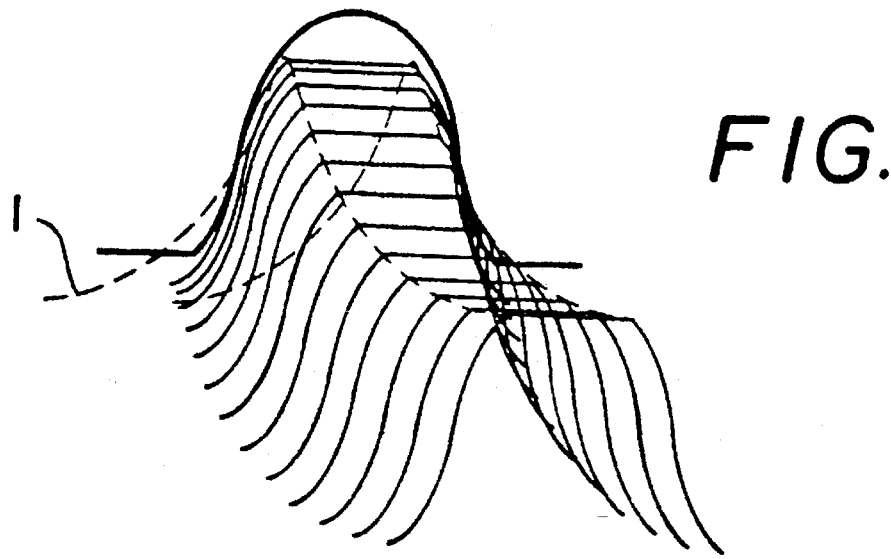
FIG. 7 illustrates a motion and a locus of one of teeth of a cup-shaped external gear when moving with respect to a tooth groove of a rigid internal gear, showing the motion and locus at a central section of rotation of tooth trace of the cup-shaped flexible external gear.
Figure 8:
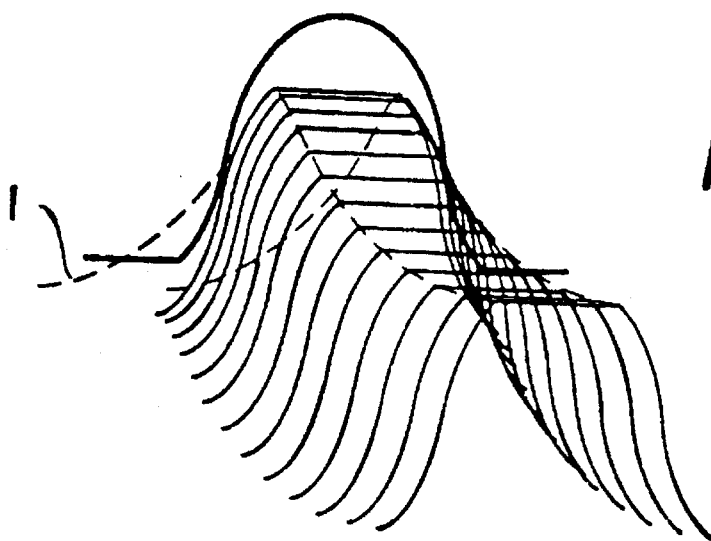
FIG. 8 illustrates a motion and a locus of one of teeth of a cup-shaped external gear when moving with respect to a tooth groove of a rigid internal gear, showing the motion and locus at a section of rotation of tooth trace on an end portion of the diaphragm of the external gear.

FIGS. 6, 7 and 8 show a motion and a moving locus l of one of teeth of the cup-shaped flexible external gear 3 with respect to a tooth groove of the rigid internal gear 2 of the flexing contact type gear drive 1, the motion and the moving locus being obtained by the rack approximation provided that the numbers of the both gears 2 and 3 become infinite. The motion and the moving locus of FIG. 6 are obtained at a section of rotation of a point 31 on the opening 3a of the teeth 30 of the cup-shaped flexible external gear 3 (at a section of non deviation which have a normal deflection). The motion and the moving locus of FIG. 7 are obtained on a section of rotation at a center 32 of tooth trace of the external gear, while those of FIG. 8 are obtained at a section of rotation of a point 33 on an end portion of the diaphragm 3b of tooth trace of the external gear. The tooth profiles illustrated in these figures are a curved tooth profile consisting of convex and concave portions which is defined by the system disclosed in Japanese Patent Laid Open No. 63-115943 as mentioned above. As is apparent from these figures, a continuous meshing is formed on the section of rotation at the opening 3a (at the section of non deviation) as shown in FIG. 6, whereas a tooth interference is occurred on the other sections of rotation of tooth trace as shown in FIGS. 7 and 8.

The moving locus of teeth at a desired section of rotation can be expressed by:

$$x = 0.5mn(\eta - \kappa \sin\eta)$$
$$y = mn(1 - \kappa\cos\eta) \quad (1)$$

wherein x is an orthogonal coordinate along a pitch line of a rack, y is an orthogonal coordinate along a depth of the rack, m is a module of the tooth, n is ½ of the number of tooth difference between the rigid internal gear and the flexible external gear, η is an angular parameter, κ is a deflection coefficient.

The following expression (2) can be derived by eliminating the term η from the expression (1).

$$x - 0.5mn \left[ \cos^{-1}\{(1 - y/m/n)/\kappa\} - \kappa\sqrt{1 - \{(1 - y/m/n)/\kappa\}^2} \right] = 0 \quad (2)$$

Further, the following expression (3) can be obtained by solving κ through a partial differential of the expression (1) in terms of κ.

$$\sqrt{1 - y/m/n} \quad (3)$$

Elimination of the term κ from the expressions (2) and (3) makes a expression defining an envelope e obtained by overlapping a moving locus with respect to each value of κ on a plane. That is, the following expression (4) can be obtained.

$$x - 0.5mn\{\cos^{-1}\sqrt{1 - y/m/n} - \sqrt{y/m/n(1 - y/m/n)}\} = 0 \quad (4)$$

The definition of the above envelope leads to the following facts. If the coefficient κ is set to be a certain value, this means to select a section of rotation having a deflection in value corresponding to the value of κ. On this section of rotation, the envelope is meant to contact with the moving locus of teeth at the point of y obtained by substituting the above value in the expression (3) for the coefficient κ. In other words, a portion of the envelope on or adjacent to this point of y represents a part of the moving locus of teeth.

However, it is insufficient to provide an effective tooth depth by using only this envelope. Therefore, according to the present invention, phantom teeth are provided in the vicinity of the end portion 33 of tooth trace of the diaphragm, and a moving locus is obtained at a section of rotation of the phantom teeth (this section is hereinafter referred to as a limit section) through the rack approximation as like as in the above. The obtained moving locus is connected to the above envelope to thereby form a composite curve, based on which the tooth profiles of the present invention are created. When the phantom teeth are provided in the vicinity of the outside of the end portion of tooth trace of the diaphragm, a desired tooth depth can be obtained, maintaining a continuous contact all over the tooth trace along the direction of tooth trace. On the other hand, the phantom teeth are provided on the end portion 33 of tooth trace of the diaphragm, a continuous meshing of the tooth profiles within the section of rotation on this position can be utilized. The latter fact is proposed at the first time here in this patent application.

Figure 9:
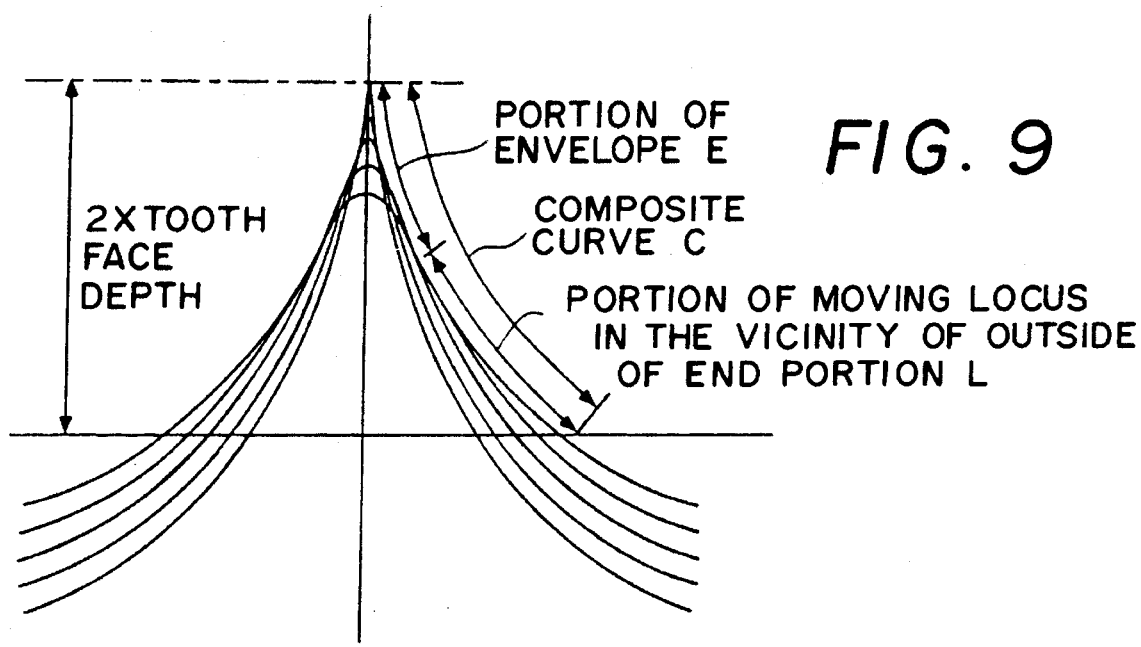
FIG. 9 is a composite curve by which a continuous contacting tooth profile of the present invention is defined.
Figure 10:
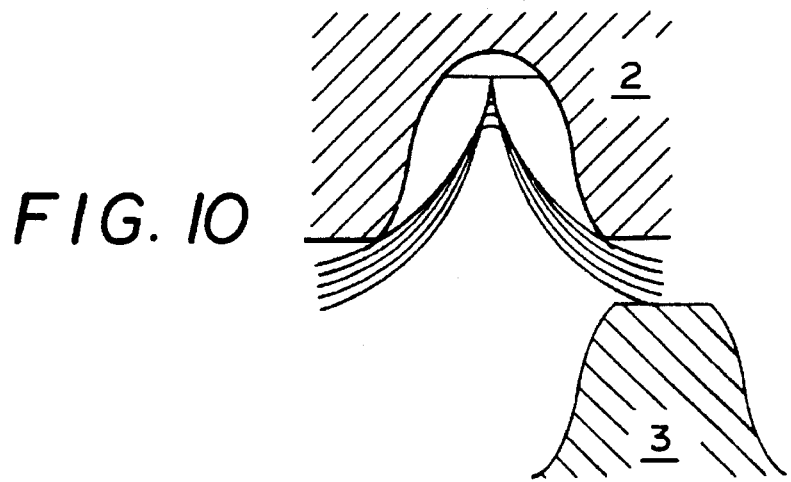
FIG. 10 illustrates a moving locus of one of teeth of a cup-shaped flexible external gear with respect to a tooth groove of a rigid internal gear, the moving locus being used to form the envelope of the composite curve of FIG. 9.

FIG. 9 illustrates the thus obtained composite curve. As shown in this figure, the composite curve C is formed of a portion of the envelope E and a portion of the moving locus L of teeth obtained at the limit section selected in the vicinity of the end portion as mentioned above. FIG. 10 shows five of moving loci of teeth at the respective sections of rotation of the respective positions in the direction of tooth trace of the flexible external gear, these moving loci being employed to obtain the envelope E.

Figure 11:
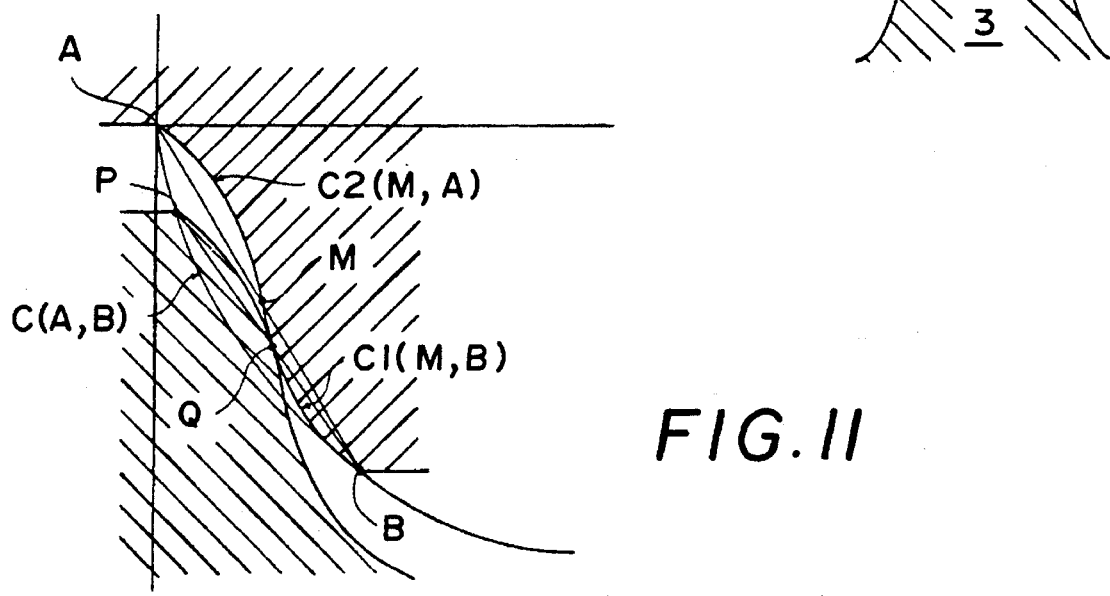
FIG. 11 shows how to introduce the tooth profiles of the present invention based on the composite curve of FIG. 9.

FIG. 11 shows how to introduce the tooth profiles of the present invention which is enable to realize a continuous contact from the composite curve C. Now, as a prescribed portion of the composite curve C, a curved portion C (A, B) is selected, ranging from its apex A to a point B, wherein a depth or height of this curved portion C(A, B) is set to be two times the depth of the tooth face. The curved portion C(A, B) is subjected to similar transformation at a ratio of 1/2 with respect to the end point B, to thereby obtain a similar curve C1(M, B), which in turn is made to be a convex tooth profile at tooth faces of the rigid internal gear. According to an example shown in the figure, a curve C2(M, A) point-symmetrical with respect to a point M (this point being a pitch point or a datum point) to the curved portion C1(M, B) is made to be a convex tooth profile at tooth faces of the cup-shaped flexible external gear. Likewise, these curved portions C2(M, A) and C1(M, A) are employed to form each of concave tooth profiles of the respective deddendum portions of the rigid internal gear and the cup-shaped flexible external gear.

The tooth profiles at the tooth faces of the gears are assured to contact with each other properly at sections corresponding to the values of κ associated with the values of y through which the teeth of the external gear move in the tooth grooves of the internal gear. This is based on the facts that the tooth profiles at tooth faces contacting with each other at the point Q of FIG. 11, for example, are symmetrical with each other with respect to this point Q, and that, through the above-mentioned process of defining the tooth profiles at the tooth faces, the tooth apex P of the flexible external gear is on the point obtained by extending two times the straight line BQ beyond the point Q from the point B with respect to the teeth of the rigid internal gear, and the inclinations of the tangents at the point Q of the both tooth profiles are equal.

When viewed along the tooth trace direction, the portion of the composite curve defined by the envelope from the apex thereof corresponds to the meshing of the teeth from the opening of the flexible external gear to the portion in the vicinity of the outside of the end portion of the diaphragm, while the remaining portion of the composite curve corresponds to a continuous contact of the phantom teeth provided in the vicinity of the outside of the end portion. Where the limit section is provided in the vicinity of the end portion of the diaphragm, no actual teeth exist on this position and therefore the meshing of the teeth thereof is an imaginary one.

Figure 12:
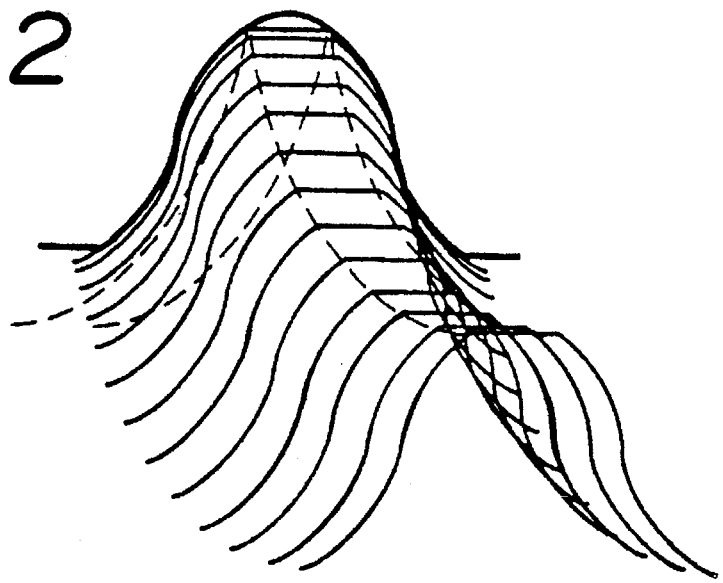
FIG. 12 illustrates a motion and a locus of one of teeth of a cup-shaped external gear having tooth profiles defined by the composite curve of FIG. 9 when moving with respect to a tooth groove of a rigid internal gear, showing the motion and locus at a section of rotation on an opening of the cup-shaped flexible external gear (a section of non deviation).
Figure 13:
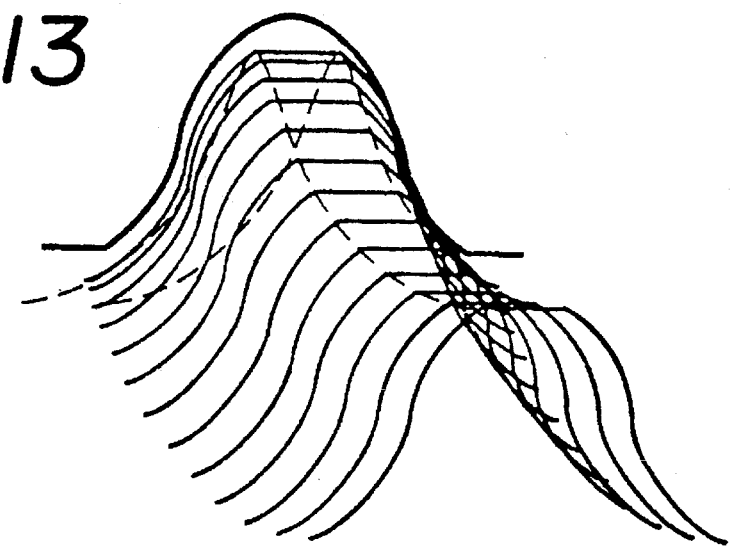
FIG. 13 illustrates a motion and a locus of one of teeth of a cup-shaped external gear having tooth profiles defined by the composite curve of FIG. 9 when moving with respect to a tooth groove of a rigid internal gear, showing the motion and locus at a central section of rotation of tooth trace of the cup-shaped flexible external gear.
Figure 14:
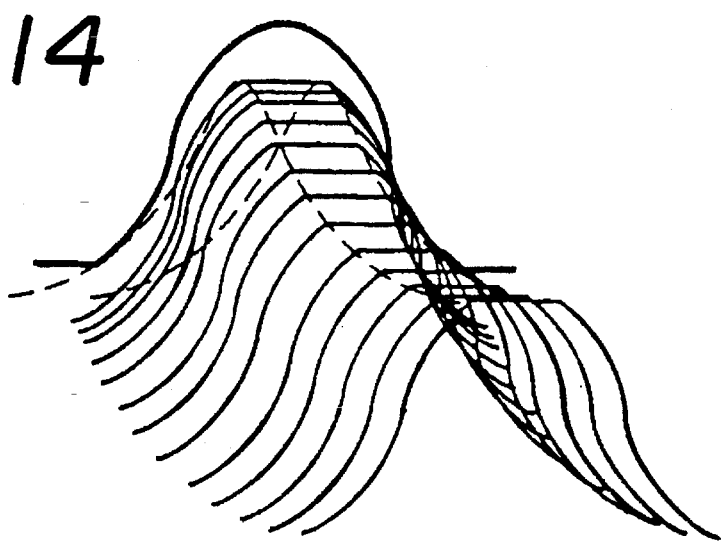
FIG. 14 illustrates a motion and a locus of one of teeth of a cup-shaped external gear having tooth profiles defined by the composite curve of FIG. 9 when moving with respect to a tooth groove of a rigid internal gear, showing the motion and focus at a section of rotation of tooth trace on an end portion of the diaphragm of the external gear.

FIGS. 12, 13 and 14 show the meshing of the tooth profiles of teeth when the limit section is selected on the end portion 33. FIG. 12 shows the meshing thereof on the section of rotation at the opening 31 (on the section of non deviation), FIG. 13 shows the meshing on the central section 32 of rotation of tooth trace, and FIG. 14 shows that on the section 33 of the end portion of tooth trace of the diaphragm. As can be seen from these figures, in the respective sections of rotation along the direction of tooth trace, respective parts of the continuous contact of the teeth are formed in accordance with a degree of contact of the envelope and each of the moving loci of the respective sections.

As is apparent by comparing these figures with corresponding FIGS. 6, 7 and 8 wherein the respective moving loci of the same positions along the direction of tooth trace of the conventional teeth, where the tooth profiles of the present invention are employed, it can be regarded that a continuous contact along all of the sections of rotation in the direction of tooth trace is established and that no defect such as the tooth interference occurs.

Two-Circular-Arc Composite Curve of the Invention

Figure 15:
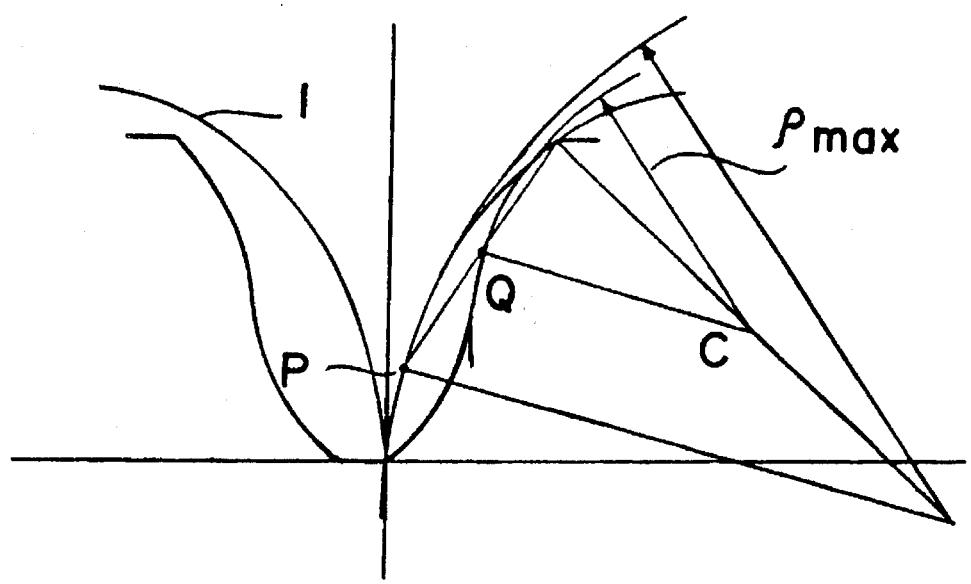
FIG. 15 illustrates that a moving locus of teeth obtained through the rack approximation and a tooth profile at a tooth face can be approximated by circular arcs.

However, since the above tooth profile is that of higher curves defined by transcendental functions, precise cutting of this tooth profile is not easy to carry out even if a numerical control by a computer system is employed. At the same time, the cutting price becomes high. The present invention is directed to solve this problem, wherein, based on the recognition that the change in radius of curvature of each of the above two curves forming the composite curve is small, each of the respective forming curves is substituted by a single circular arc. The fact that the change in radius of curvature is small, is revealed at the first time by the present inventors et. al. in Japanese Patent Laid Open No. HEI 1-295051 and is the foundation of the invention disclosed in this publication. FIG. 15 illustrates that a moving locus of the teeth obtained by the rack approximation and the tooth profile at the tooth faces can be approximated by circular arcs.

Figure 16:
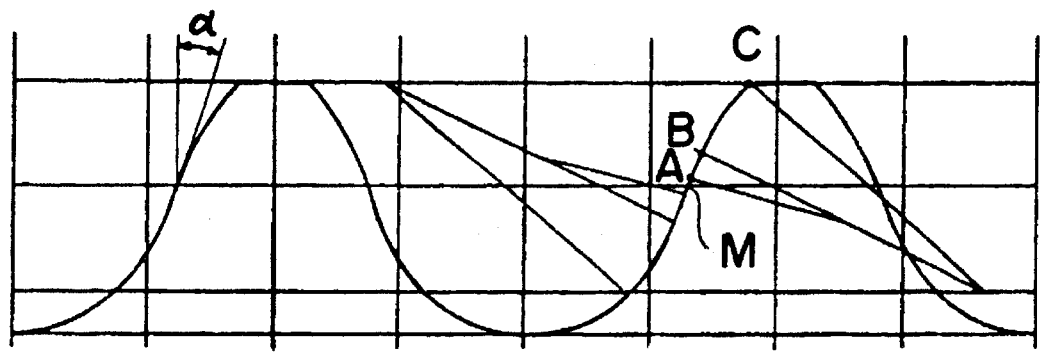
FIG. 16 is an example of a standard rack of tooth profiles of the present invention.

FIG. 16 shows an example of a standard rack of the tooth profiles of the present invention. For the necessity of providing cutting tools and for convenience, a straight line L having a pressure angle $\alpha$ is disposed in the vicinity of a datum point M of the tooth profiles at the tooth faces, a circular arc AB smoothly connected thereto is an approximated curve of a similar curve obtained by subjecting the envelope of the above moving loci to the similar transformation at a reduction ratio of 1/2, a circular arc BC connected to the above circular arc is an approximated curve of a similar curve obtained by subjecting to the similar transformation at a reduction ratio of 1/2 the moving locus of teeth of the flexible external gear at the section of rotation in the vicinity of the end portion of tooth trace of the diaphragm connected smoothly to the above envelope. However, since the pressure angle of the straight line on the datum point has a finite value other than zero, the radii of the above circular arcs are preferably set to be somewhat larger in light of maintaining the tendency of continuous contact of the teeth. This structure is also preferable in terms of reduction of the contact stress of the tooth surfaces.

Figure 17:
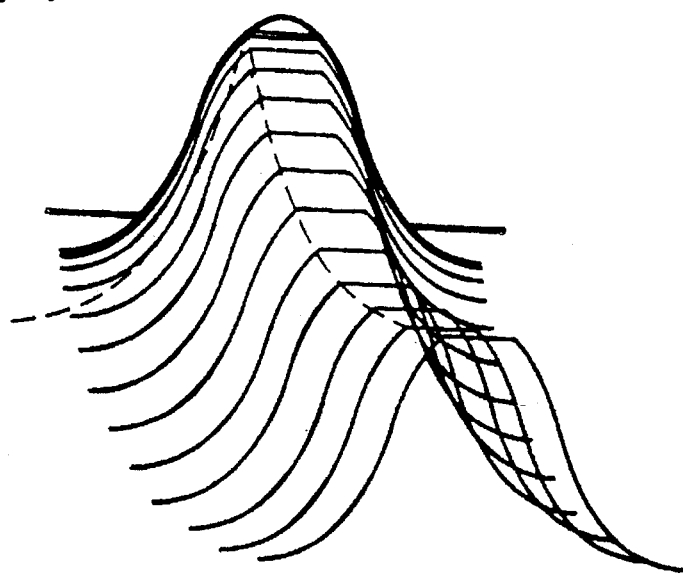
FIG. 17 illustrates a motion and a locus of one of teeth of a cup-shaped external gear having tooth profiles defined by the present invention when moving with respect to a tooth groove of a rigid internal gear, showing the motion and locus at a section of rotation on an opening of the cup-shaped flexible external gear (a section of non deviation).
Figure 18:
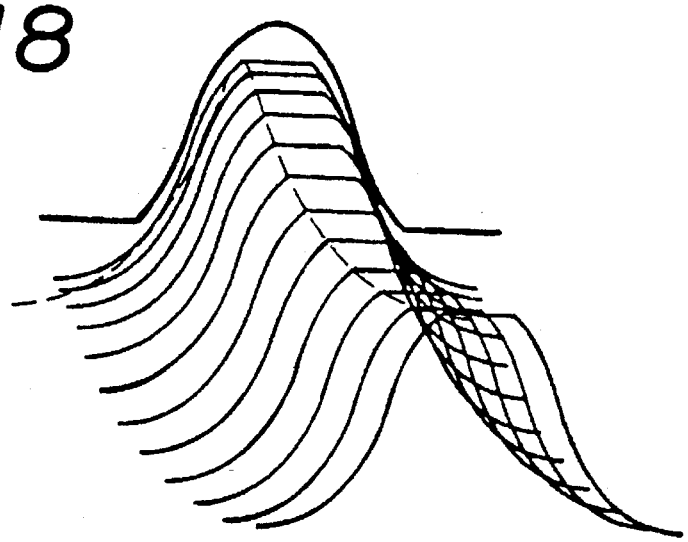
FIG. 18 illustrates a motion and a locus of one of teeth of a cup-shaped external gear having tooth profiles defined by the present invention when moving with respect to a tooth groove of a rigid internal gear, showing the motion and locus at a central section of rotation of tooth trace of the cup-shaped flexible external gear.
Figure 19:
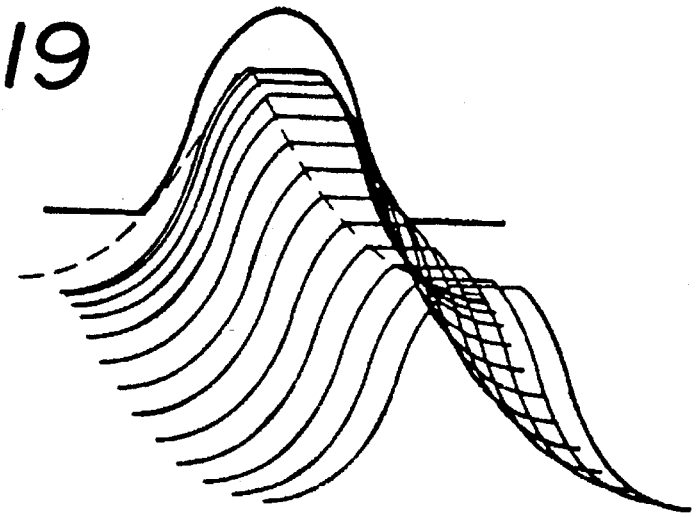
FIG. 19 illustrates a motion and a locus of one of teeth of a cup-shaped external gear having tooth profiles defined by the present invention when moving with respect to a tooth groove of a rigid internal gear, showing the motion and locus at a section of rotation of tooth trace on an end portion of the diaphragm of the external gear.

FIGS. 17, 18 and 19 show an example of meshing of the tooth profiles of the present invention. FIG. 17 shows the meshing at the section of rotation of the opening, FIG. 18 shows that at the section of rotation located on the center of tooth trace, while FIG. 19 shows that at the section of rotation of the end portion of the diaphragm. When the meshing of the teeth of the present invention is viewed along the direction of tooth, trace, the portion of the circular arc having a small radius adjacent to the datum point corresponds mainly to the meshing ranging from the opening of the flexible external gear to the end portion of tooth trace of the diaphragm thereof along the direction of tooth trace, while the circular arc connected to the above circular arc and having a large radius corresponds to the continuous contact of the tooth profiles within the section of rotation in the vicinity of the end portion of tooth trace of the diaphragm. As mentioned above, if the section of the rotation is positioned in the vicinity of the outside of the end portion of tooth trace of the diaphragm, no teeth exist on this portion and therefore the meshing within this section is an imaginary one. However, the meshing of the teeth of the end portion of tooth trace of the diaphragm can be regarded as that similar to this imaginary meshing.

The effect of the straight line on the datum point of the standard rack is that the tooth profiles of the both gears corresponding to this portion become an involute tooth profiles and this makes it extremely easy to cut gears in terms of control of dimensions of gears such as tooth thickness. In addition, since the pressure angle of the straight line has a finite value, the radii of the respective circular arcs must be somewhat large in order to maintain the tendency of the continuous contact. This makes to reduce the contact stress of the tooth surfaces, and is preferable.

As will be understood from the foregoing description, with the tooth profiles of the present invention employed, a smooth meshing of the teeth along the direction of tooth trace can be realized even if the coning occurs, and at the same time a degree of meshing of teeth along the direction of tooth trace can also be equalized generally. In the past, the meshing of teeth of the gears tends to be offset to the side of the opening of tooth trace because of the coning, which causes to form the meshing of teeth no more than half of the portion along the direction of tooth trace. Thus, the flexible external gear of the prior art must be configured such that the ratio of the axial whole length thereof to the diameter thereof is about 1. In contrast to this, according to the present invention, the ratio can be reduced in the range of about 0.2 to about 0.7, preferably in the range of about 0.5 to about 0.7. Although, the increase in amount of coning causes to increase stress appeared in the portions other than the tooth portion of the flexible external gear, and therefore it is necessary to make additional considerations such as on reducing the thickness of portions where stress is increased.

Industrial Applicability

According to the present invention, a flexing contact type gear drive having a cup-shaped flexible external gear can be realized which makes it possible to form a smooth meshing of teeth all over to the end portion of tooth trace of the diaphragm without additional processings such as crowning and relieving to the external gear, and thus, with maintaining the tooth thickness constant. While, simultaneously it is possible to provide a flexing contact type gear drive of high strength, rigidity and precision and of small size.

We claim:

1. A flexing contact type gear drive having a rigid internal gear, a cup-shaped flexible external gear disposed inside the internal gear, a deflection thereof being increased in accordance with a distance measured from a diaphragm thereof owing to coning from the diaphragm toward an opening thereof, and a wave generator for flexing the external gear into an elliptical shape so as to mesh with the internal gear at two places on a major axis of the elliptical shape and for moving the meshing portions circumferentially, a relative rotation of the both gears being generated by the rotation of the wave generator;

wherein respective tooth profiles of the internal and external gears are constructed such that the tooth face portion is formed of a straight line disposed in the vicinity of a datum point, a first convex circular arc smoothly connected thereto and a second convex circular arc smoothly connected to the first convex circular arc and having a radius of curvature larger than the first convex circular arc, while, the dedendum portion excluding the root is created by a standard rack consisting of a tooth profile formed by a curve point-symmetrical with respect to the datum point to the tooth profile at the tooth face or a curve obtained by correcting the above curve; and, wherein the curve defined by the first and second convex circular arcs is an approximated curve of a similar curve obtained by subjecting to similar transformation at a reduction ratio of 1/2 from the limit point of meshing selected on a composite curve which is obtained by connecting a moving locus of teeth of the flexible external gear in a section of rotation in the vicinity of the end portion of the tooth trace on the side of a diaphragm to an envelope of moving loci obtained by overlapping on one plane of rotation the moving loci obtained by rack approximation of the external gear to the rigid internal gear in sections of rotation at the respective positions in the direction of tooth trace of the cup-shaped flexible external gear.

2. A flexing contact type gear drive according to claim 1, wherein a ratio of a whole axial length of the cup-shaped flexible external gear to a diameter thereof is set in the range of about 0.2 to 0.7.

* * * * *

UNITED STATES PATENT AND TRADEMARK OFFICE
CERTIFICATE OF CORRECTION

PATENT NO. : 5,458,023
DATED : October 17, 1995
INVENTOR(S) : Shoichi ISHIKAWA et al It is certified that error appears in the above-indentified patent and that said Letters Patent is hereby corrected as shown below:

In Column 3, line 11, after "1" insert -- is --.

In Column 5, line 23, delete "$\chi=0.5(\eta-\kappa \mathrm{Sin}\eta)$" and insert -- $\chi=0.5(\eta-\kappa\sin\eta)$ --.

In Column 5, line 46, delete "$\sqrt{1-y/m/n}$" and insert -- $\kappa=\sqrt{1-y/m/n}$ --.

In Column 8, line 6, delete "tooth, trace" and insert -- tooth trace --.

Signed and Sealed this

Ninth Day of April, 1996

Attest:

BRUCE LEHMAN

Attesting Officer

Commissioner of Patents and Trademarks